May 16, 1944.  C. G. DAHLERUP  2,348,712
GEAR TESTING MACHINE
Filed March 17, 1943  4 Sheets-Sheet 1

INVENTOR
Christian G. Dahlerup

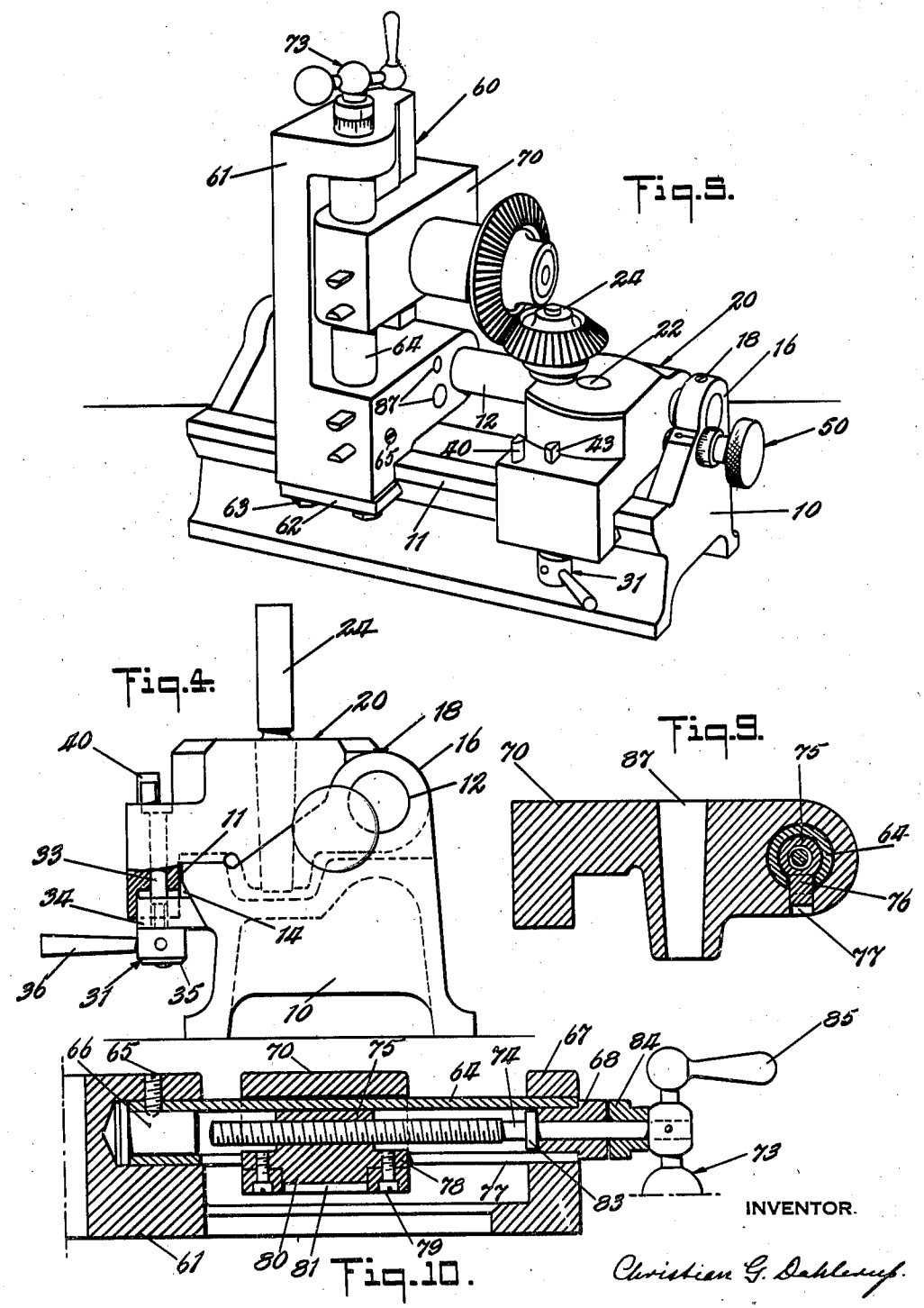

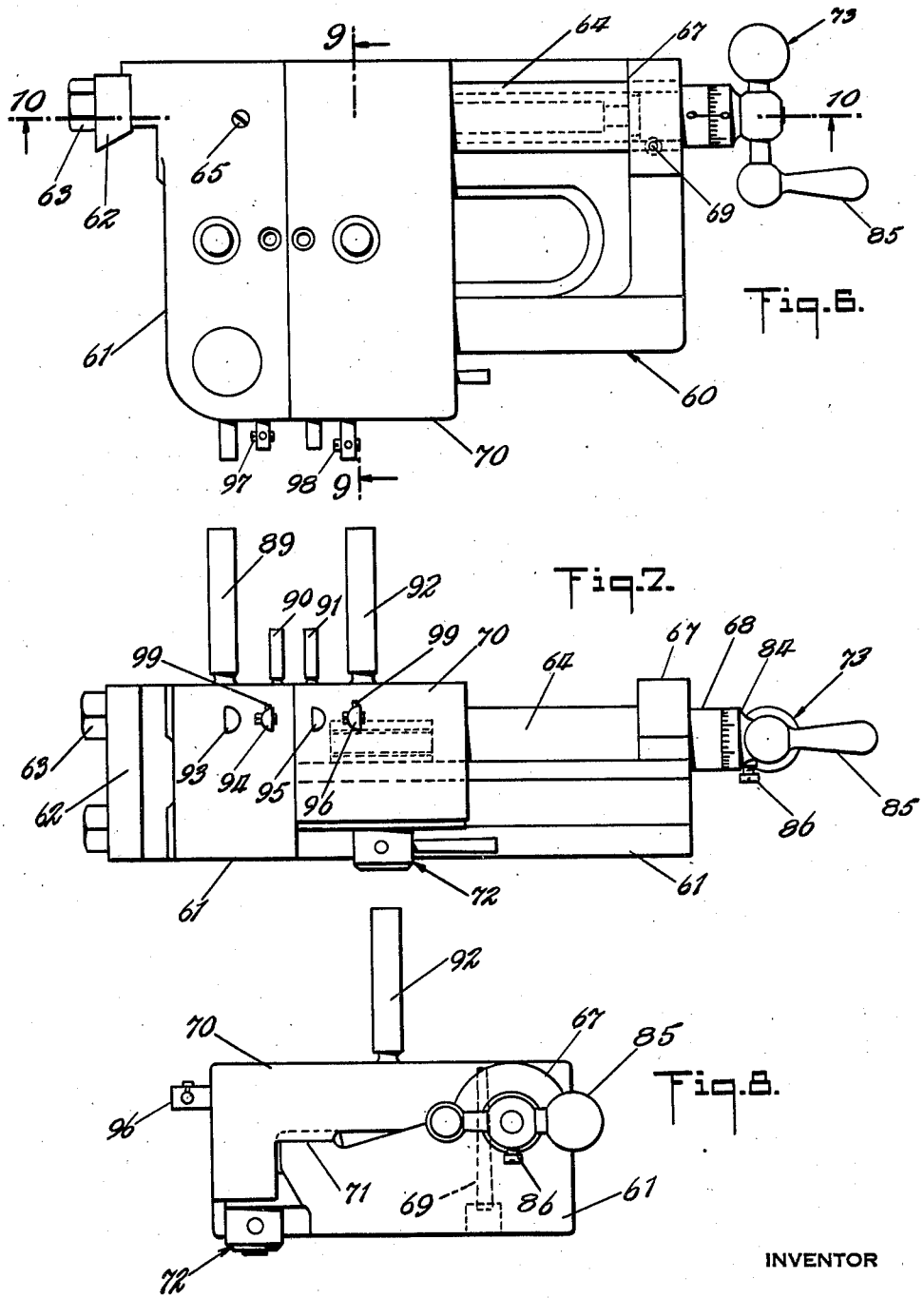

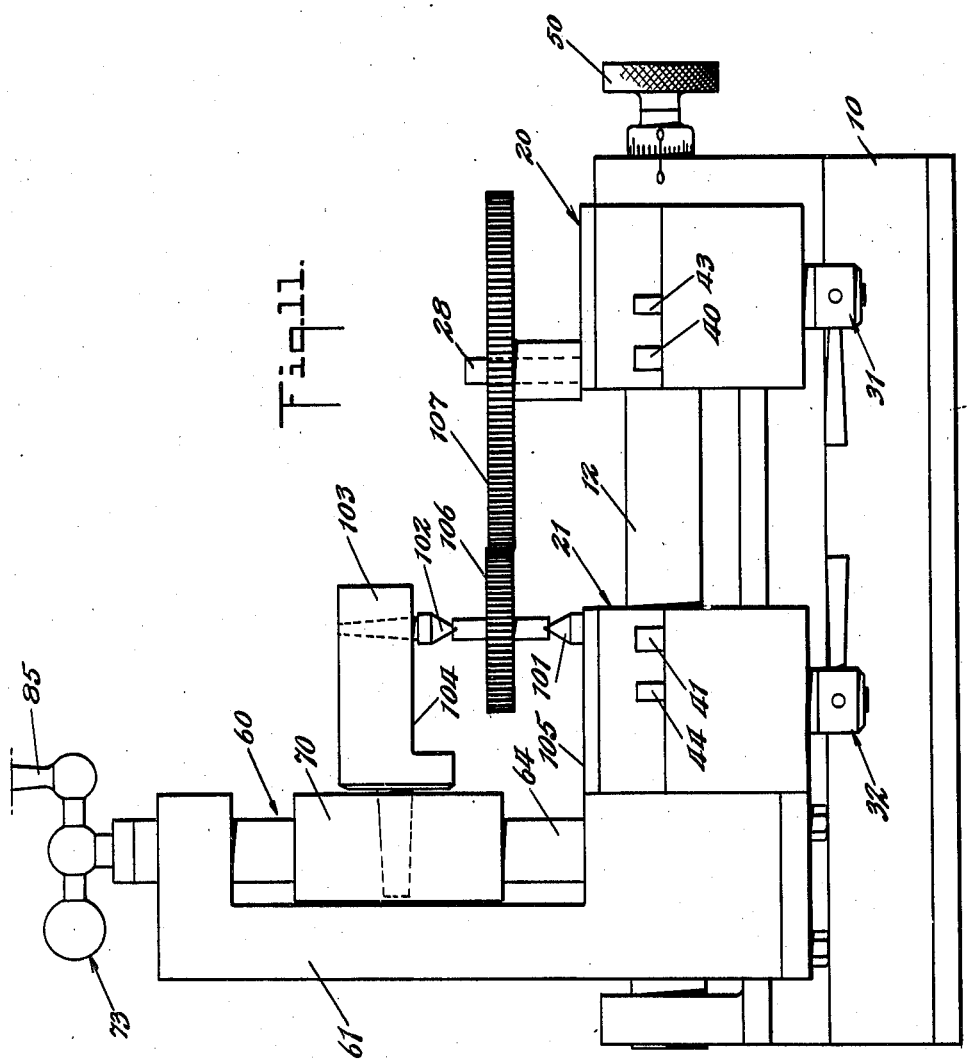

Patented May 16, 1944

2,348,712

UNITED STATES PATENT OFFICE 2,348,712

GEAR TESTING MACHINE

Christian G. Dahlerup, Flushing, N. Y., assignor to Atlantic Gear Works, Incorporated, New York, N. Y., a corporation of New York Application March 17, 1943, Serial No. 479,535

12 Claims. (Cl. 33—179.5)

This invention relates to gear testing machines. It is especially related to machines adapted for testing gears operating in pairs whereby to determine their accuracy in workmanship relative to their center distance and the concentric form of their teeth.

One of the objects of my invention is to provide a novel center testing machine which is efficient and accurate and comparatively simple to operate.

Another object is to provide a machine which requires little time for setting the various parts before testing gears.

A further object is to provide novel means and arrangements in said machine, adapted for testing spur and bevel gearing, both of the straight and helical tooth type.

Another object is to provide means adapted for testing gears rotatable between center points instead of on arbors.

A further object is to provide simple and effective means of regulating as well as rigidly maintaining the movable parts of said machine in the position desired.

These with other novel features of construction and arrangement of parts, which will be more fully hereinafter described and claimed, constitute my invention.

In the drawings:

Fig. 4 is a side elevation of the machine shown in Figures 1 to 3.

Fig. 5 is a perspective view of the gear testing machine as used for bevel gearing.

Fig. 6 is a plane view of the bevel gear attachment forming a part of the machine of Fig. 5.

Fig. 7 is a side elevation of said attachment.

Fig. 8 is an end elevation thereof.

Fig. 9 is a view of a section taken on the line 9—9 of Fig. 6.

Fig. 10 is a section on the line 10—10 of Fig. 6.

Fig. 11 is a side view of the gear testing machine in combination with attachments adaptable for testing gears rotatable on center points.

Figures 1, 2, 3:
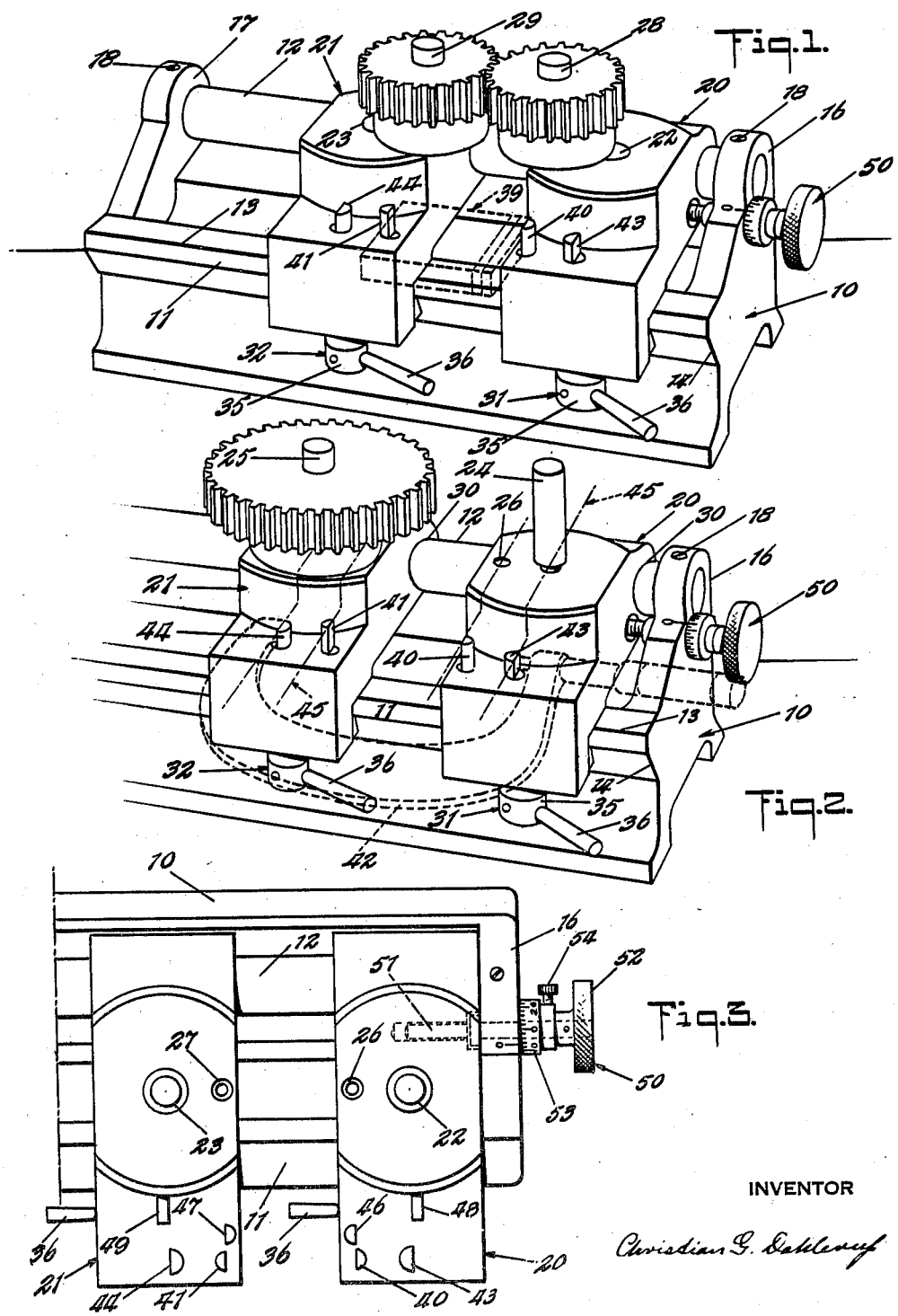
Fig. 1 is a perspective front view of my gear testing machine as used for spur gearing.
Fig. 2 shows part of the front view of Fig. 1 as used for different size gears.
Fig. 3 shows part of a top view of said machine with modifications.

In the construction illustrated in the drawings, 10 comprises a supporting frame preferably of cast iron, having guide elements 11 and 12 extending in longitudinal direction. Guide element 11, which forms an integral part with said frame, has a machine finished resting surface 13, substantially parallel to the base surfaces of said frame and a machine finished clamp surface 14 at an incline to said resting surface 13.

Guide element 12 comprises a comparatively heavy round rod located at its end parts in lugs 16, 17 of frame 10 and securely held therein by suitable set screws 18.

On both these guide elements are slidably held a general gear positioning member 20 and a specific gear positioning member 21 comprising each a solid metal block, partly cylindrical, and being provided with respective tapered holes 22, 23 adapted to seat each a standard taper shank, comprising an arbor, and forming respective gear supporting elements 24, 25.

Two more tapered holes 26, 27 in respective members 20, 21, have a comparatively small size and are located on a straight line passing through the centers of the larger holes 22, 23. The respective additional arbors or gear supporting elements 28, 29 fitting into these small holes are used whenever the large sized arbors are absent.

Both sets of arbors serve the purpose to maintain a set of spur gears in mesh for testing purposes.

The rear part of each of the gear positioning members 20, 21 is provided with a guide hole 30 having a close, sliding fit on guide rod 12. The front part of these members is provided with respective locking devices 31, 32 comprising each a lock screw 33, securely held in each member and having its threaded part extending downward. Its stem passes through a clamp block 34, having an inclined locking surface at substantially the same angle as the clamp surface 14 of the guide element 11.

A clamp nut 35 on screw 33, and underneath said clamp block 34, serves the purpose to securely press said block against surface 14 and thereby draw each of the members 20, 21 in a direction away from the guide rod 12 and toward the horizontal resting surface of guide element 11.

Rod 12 is located on a higher plane than the horizontal resting surface, so that when either one of the members are being locked, they are not alone drawn forward but in a downward direction as well, causing same to press against the delicately leveled horizontal surface, which also serves as a sort of reference surface for perfectly aligning the gear positioning members and their arbors.

Clamp nut 35 is provided with a suitable pin or handle 36 which is made removable, so that the nut can be unscrewed and clamp block 34 be taken off for the purpose of removing said members 20, 21 from the frame. In order to do this the operator will loosen both set screws 18 of frame 10 and push guide rod 12 to one side, making these members free for separation from plane 10.

When testing gears as to their accuracy in operation it is important to position same relative to each other at a distance which is the sum of their pitch radii. Because this distance quite often requires exact measurement and checking with either gauge blocks or micrometer, the step-like sections of the positioning members front part are provided with suitable, rigidly secured, gauge pins.

When the distance between the centers is to be determined by a gauge block 39 shown as a phantom view in Fig. 1 the gauge surfaces of gauge pins 40, 41 in respective positioning members 20, 21 will face each other and if the center distance is to be obtained by means of a micrometer 42, depicted in phantom in Fig. 2, the gauge surfaces of gauge pins 43, 44 are hidden from each other.

Each gauge surface of the gauge pins 40, 41, 43, 44 has a fixed location in relation to the center line of the respective arbors 28, 29, 24, 25.

This location is determined by an imaginary straight line extension 45 of each gauge surface falling in line with the axis at its corresponding arbor.

The advantage of this arrangement consists in enabling the operator to obtain a direct reading of the sum of any two gear radii.

Because the magnitude of the distance between the gauge surfaces is the same as that of the distance between the axes at the arbors, it is evident that all calculations as to addition and subtraction of distances, required with a different arrangement, are thereby eliminated.

A troublesome source of errors has thus been removed and the operator need rely only on his accurately reading the magnitude obtainable from his micrometer or gauge blocks.

Should it be desirable to provide two pairs of gauge pins for each set of arbors, enabling the operator to measure the center distance between small or large size arbors by either gauge block or by micrometer, an arrangement as that shown in Fig. 3 can be provided. Gauge pins 46, 47, which have their gauge surfaces in alignment with those of respective gauge pins 40, 41, are adapted for measurement with a micrometer, while the gauge pins 48, 49 aligned for measuring the distance between arbors 24, 25, are adapted to engage the measuring surfaces of a gauge block.

Before making a test, the operator will first select the size arbors suitable for the holes of the gear to be tested. After entering the arbors in either pair of holes in the positioning members 20, 21, he will move the latter relative to each other until the gears are in mesh. Having locked positioning member 21 to the frame by means of the locking device 32, he will then measure the distance between the gears in the manner described. Should this distance not be correct, a regulating device 50, Fig. 3, has been provided, adapted to move the general positioning member 20 with its gear into the position desired, so that this member can be locked against frame 10 and the gears be tested.

The regulating device 50 comprises a threaded shank 51, freely rotatable in the wall section of lug 16 and engaging with its threaded end part a threaded hole in the positioning member 20.

This shank, which is prevented to move axially has secured to its other end part a knob 52. A graduated measuring drum 53, located between said knob and the wall of lug 16, is rotatable on said shank and is provided with a set screw 54, having a knurled head. The drum may thus be held to said shank after it has been set in relation to a zero line marked on lug 16. The pitch of the thread of shank 51 is preferably of a magnitude to permit indication of 0.001 inch on the graduation marks of drum 53.

Having adjusted the two positioning members 20, 21 to the required measure of the gears center distance, the operator will place the zero mark on the measuring drum 53 in line with the zero mark engraved on the upper face of lug 16.

If during a test it is found that the mesh of the gears is either too close or too free, a movement of the regulating and adjusting device 50 will place these gears in correct operative relation, and its measuring drum will then indicate how many thousandths of an inch the length of the new center distance differs from the one actually required.

Referring now to Figures 5 to 10, the gear testing machine shown therein comprises the identical supporting frame 10 and general gear positioning member 20 shown in the views previously described. In the machine shown in Fig. 5 the specific gear positioning member 21 of Fig. 1 used for spur gears, has been displaced by one adapted for testing bevel gears. This member, to be referred to as gear positioning unit 60, comprises a mounting frame 61 adapted for attachment to guide rod 12 of the supporting frame 10.

A clamping block, in form of an angular faced plate 62 held by two screws 63 against the frame 61, is adapted to securely lock the latter against the resting surface of supporting frame 10 in the same manner as the clamping device 31.

Frame 61 is provided with a tubular guide rod 64 rigidly held at one end by a set screw 65 passing through the wall of the rod and being seated in a shouldered plug 66, Fig. 10. The other end of the guide rod, supported in a lug 67 of frame 61, holds a shouldered sleeve or bushing 68, having a zero line marked on the cylindrical surface of its shoulder part. A taper pin 69, Figures 6 and 8 passing into lug 67, through part of the wall of rod 64 and part of bushing 68, securely locks the rod and bushing to the frame, thus providing a steady support for the supplemental gear positioning member 70 freely movable on said rod and on the flat guide surface 71 of the mounting frame 61.

The latter has an inclined clamping surface and a clamping device 72 in the supplemental member which is similar to the devices 31, 32 of Fig. 1. It locks this member 70 securely against the resting surface of mounting frame 61.

When unlocked, this member is moved by an adjusting or regulating device 73 comprising a threaded shank 74 engaging an adjusting nut 75, Figures 9 and 10.

This nut, having a cylindrical surface around the center of its threaded hole, is slideable in the hole of the guide rod 64. A rectangular shaped extension 76 from this surface passes through a long slot 77 in the guide rod and permits the nut being moved therein by means of the threaded shank 74.

Two longitudinally placed flanges 78 on said extension have each a threaded hole for engagement of screws 79 in the lower part of member 70. In order to positively locate and lock said nut in member 70, the lower part 80 of extension 76 projects and tightly fits into a slot 81 of this lower part.

Shank 74 engaging the nut 75 is supported in the bearing sleeve 68, being prevented against axial movement by means of a shoulder 83 resting against the sleeve 68 on one side and by a graduated indicating drum 84 and a handle 85 on the other side. While the handle is rigidly held on the shank, the drum 84 is free to rotate for adjustment and can be locked against the shank by means of a knurled head set screw 86.

Both the mounting frame 61 and the supplemental gear positioning member 70 are provided with large and small tapered holes 87 for respective gear supporting arbors 89, 90 and 91, 92.

The front surfaces of both the frame 61 and member 70 possess respective gauge pins 93, 94 and 95, 96 which are arranged in relation to the respective arbors in the same manner as the gauge pins previously described. Gauge pins 94 and 96 are each provided with respective adjusting screws 97, 98, for a correct alignment of their gauge surfaces with the center lines of the arbors.

Each of these screws is locked by a set screw 99.

The gear testing machine shown in Fig. 11, comprises a combination of the general and specific gear positioning members 20, 21 with the gear positioning unit 60, for the purpose of providing means for testing gears which are to operate on centers instead of an arbor and where the gear and its shaft may be integral with each other.

In tapered hole 27 of the specific member 21 is held a steel center 101 having oppositely located thereto a second steel center 102 which is maintained in the center attachment 103 supported in the supplemental gear positioning member 70 of unit 60.

The lower surface 104 of attachment 103 is flat and parallel to the top surface 105 of the specific member 21, serving the purpose to establish a perfect alignment between the two gear centers.

Before gear 106 is placed between the steel centers and before attachment 103 is pressed home in a fixed position the operator will place a gauge block between the surfaces 104, 105 and turning handle 85 will cause the attachment 103 to press against the gauge block and thus locate surface 104 parallel to 105 and the steel center 102 in line with center 101.

After gear 106 has been placed between the steel centers, the master or companion gear 107 rotatably suported on arbor 28 may now be located in definite relations to gear 106 by means of either a gauge block or micrometer and respective gauge pins 40, 41 or 43, 44, in the manner illustrated in Figures 1 and 2.

Having described the invention, it is evident that various modifications thereof may be apparent to those skilled in the art, without departing from the spirit and scope of the invention, and it is therefore understood that the same is only to be limited by the scope of the prior art and the appended claims.

What I claim is:

1. In a machine of the character described a supporting frame, straight line guide elements forming of said frame, gear positioning members slideable on a straight line and adapted to assume a fixed setting on said guide elements, each of said members comprising supporting means having a central axis and a cylindrical surface for rotating a gear thereon, gaugeable means comprising parts immovably held on both said members and having each a gauge surface, the measure of a distance between said gauge surfaces obtainable during a fixed setting of said gear positioning members having the same magnitude as that of the distance between said central axes at the same setting.

2. In a machine of the character described a supporting frame, straight line guide elements forming part of said frame, gear positioning members slideable on a straight line and adapted to assume a fixed setting on said guide elements, each of said members comprising supporting means having a central axis and a cylindrical surface for rotating a gear thereon, gaugeable means comprising parts immovably held on both said members and having each a gauge surface, the measure of a distance between said gauge surfaces obtainable during a fixed setting of said gear positioning members having the same magnitude as that of the distance between said central axes at the same setting, said gaugeable means having surfaces facing each other and adapted for contacting the measuring surfaces of a gauge block.

3. In a machine of the character described a supporting frame, straight line guide elements forming part of a said frame, gear positioning members slideable on a straight line and adapted to assume a fixed setting on said guide elements, each of said members comprising supporting means having a central axis and a cylindrical surface for rotating a gear thereon, gaugeable means comprising parts immovably held on both said members and having each a gauge surface, the measure of a distance between said gauge surfaces obtainable during a fixed setting of said gear positioning members having the same magnitude as that of the distance between said central axes at the same setting, said gaugeable means having surfaces hidden from each other and adapted for contacting the measuring surfaces of a micrometer.

4. In a machine of the character described a supporting frame, straight line guide elements forming part of said frame, gear positioning members slideable on a straight line and adapted to assume a fixed setting on said guide elements, each of said members comprising supporting means having a central axis and a cylindrical surface for rotating a gear thereon, gaugeable means comprising parts immovably held on both said members and having each a gauge surface, the measure of a distance between said gauge surfaces obtainable during a fixed setting of said gear positioning members having the same magnitude as that of the distance between said central axes at the same setting, and means adapted for adjusting one of said gaugeable means whereby to maintain respective measures of identical magnitude between both said gauge surfaces and said axis at a setting.

5. In a machine of the character described a supporting frame, straight line guide elements forming part of said frame, gear positioning members slideable on a straight line and adapted to assume a fixed setting on said guide elements, each of said members comprising supporting means having a central axis and a cylindrical surface for rotating a gear thereon, gaugeable means comprising parts fixedly located on both said members and having each a gauge surface, the position of each axis of said supporting means relative to its corresponding gauge surface comprising a fixed location determinated by an imaginary straight-line extension of said guage surface falling in line with said axis said straight-line extensions being parallel to each other.

6. In a machine of the character described a supporting frame, straight line guide elements forming part of said frame, gear positioning members slideable on a straight line and adapted to assume a fixed setting on said guide elements, each of said members comprising supporting means having a central axis and a cylindrical surface for rotating a gear thereon, gaugeable means comprising parts fixedly located on both said members and having each a gauge surface, the position of each axis of said supporting means relative to its corresponding gauge surface comprising a fixed location determinated by an imaginary straight-line extension of said gauge surface falling in line with said axis, said straight-line extensions being parallel to each other an adjusting device, comprising means for indicating the measure of its movement and in combination with one of said gear positioning members, said device being adapted to move said member in either one of two directions on said guide elements.

7. In a machine of the character described a supporting frame, straight line guide elements forming part of said frame, gear positioning members slideable on a straight line and adapted to assume a fixed setting on said guide elements, each of said members comprising supporting means having a central axis and a cylindrical surface for rotating a gear thereon, gaugeable means comprising parts fixedly located on both said members and having each a gauge surface, the position of each axis of said supporting means relative to its corresponding gauge surface comprising a fixed location determinated by an imaginary straight-line extension of said gauge surface falling in line with said axis, said straight-line extensions being parallel to each other said supporting means comprising a conical-shaped seating surface adapted for a positive location on said gear positioning member.

8. In a gear testing machine a supporting frame, a general gear positioning member and a gear positioning unit, both slideable on said frame and adapted to be locked to said frame, both said member and unit having each a cylindrical gear-supporting element and of which their axes are located at an angle and in line in a direction to the length of said frame, regulating means on said member and said unit adapted for adjusting the relative positions of said supporting elements and for indicating the measure of their movements in either direction, said gear positioning unit being removable from said supporting frame, having a base surface at substantially right angle to said gear-supporting elements and having means adapted for cooperatively testing various sized spur gears independently of said general positioning member.

9. In a gear testing machine a supporting frame, a general gear positioning member and a gear positioning unit, both slideable on said frame and adapted to be locked to said frame, both said member and unit having each a cylindrical gear-supporting element and of which their axes are located at an angle and in line in a direction to the length of said frame, regulating means on said member and said unit adapted for adjusting the relative positions of said supporting elements and for indicating the measure of their movements in either direction, said gear positioning unit being removable from said supporting frame, and comprising a mounting frame having a base surface at substantially right angle to said gear-supporting elements and having an additional gear-supporting element located in relation to said unit's other supporting element, both elements of said unit being adapted for cooperatively testing various sized spur gears independently of said general positioning member.

10. In a gear testing machine a supporting frame, a general gear positioning member and a gear positioning unit, both slideable on said frame and adapted to be locked to said frame, both said member and unit having each a cylindrical gear-supporting element and of which their axes are located at an angle and in line in a direction to the length of said frame, regulating means on said member and said unit adapted for adjusting the relative positions of said supporting elements and for indicating the measure of their movements in either direction, said gear positioning unit being removable frame said supporting frame, and comprising a mounting frame having a base surface at substantially right angle to said gear-supporting elements and having an additional gear-supporting element located in relation to said unit's other supporting element, both of said elements being adapted for cooperatively testing various sized spur gears independently of said general positioning member, gaugeable means located in relation to both said elements of said unit comprising parts immovably held in said elements and adapted for measuring the distance between the axes of said elements, the measure of a distance between said gaugeable means obtainable during a setting of said elements on said unit, having the same magnitude as that of the distance between said elements at the same setting.

11. In a gear testing machine a supporting frame, guide elements forming part of said frame, one of said elements having a resting surface and an inclined surface adapted for clamping purposes, the other guide element comprising a circular rod, detachably secured to said frame, gear positioning members slideable on said guide elements, screw operated clamping means forming part of each of said members and comprising a block having an angular surface adapted to be locked against the inclined surface of one of said guide elements; during locking operations said members being drawn in a direction away from said circular rod element and toward said resting surface, whereby to securely fasten said members in fixed positions on said supporting frame.

12. In a machine for testing gears a supporting frame, guide elements forming part of said frame, gear positioning members slideable and adapted to assume a fixed setting on said guide elements, said members comprising gear supporting means having centrally located axes placed relative to each other in horizontal and vertical alignment, for the support of respectively located gears on said members, said gear supporting means comprising an arbor for rotating one gear thereon and respective opposingly positioned centering means for locating another gear between centers, adjustable means on at least one of said members for positioning said axes and gaugeable means on both said members, comprising each a gauge surface, the measure of a distance between said gauge surfaces obtainable during a fixed setting of said gear positioning members having the same magnitude as that of the distance between said central axes at the same setting.

CHRISTIAN G. DAHLERUP.